UNITED STATES PATENT OFFICE

BIRKETT WYLAM AND JOHN THOMAS, OF GRANGEMOUTH, SCOTLAND, ASSIGNORS TO SCOTTISH DYES, LIMITED, OF GRANGEMOUTH, STIRLING, SCOTLAND

ESTERIFICATION OF CELLULOSE MATERIALS

No Drawing. Application filed January 30, 1929, Serial No. 336,321, and in Great Britain January 26, 1928.

This invention relates to the esterification of cellulose bodies, and more particularly to the production of cellulose acetate or acetates.

The usual method of obtaining cellulose acetates is to treat the cellulosic material with acetic anhydride in the presence of sulphuric acid, chlorine, sulphuryl chloride or the like, which may, for example, act as a catalyst. It is usually the practice to carry out the reaction in the presence of an excess of acetic acid, serving, for example, as a diluent and solvent.

The object of the present invention is to provide an improved or modified process for producing cellulose acetate or acetates, these being either known or new bodies.

The invention connsists in a process for the acetylation of cellulostic material by the action of an acetylating agent, which comprises the presence of pyridine sulphuric anhydride being synonymous with N-pyridinium or N-pyridinium sulphonic acid and is a combination of pyridine and sulphur trioxide, description of which may be found in Deutsche Chemische Gesellschaft Berichte 59 (1926) 1166.

The invention also consists in processes for the acetylation of cellulosic material substantially as herein described and which may be effected by heating with acetic anhydride or acetyl chloride in the presence of pyridine sulphuric anhydride.

The invention further consists in products which may be made according to processes substantially as herein described, or by the equivalents of these processes, including a cellulose acetate which contains up to about 56% of acetyl group.

The following examples illustrate how the invention may be carried into effect, all parts referred to being parts by weight.

Example I

This deals with the production of a cellulose acetate only slightly soluble in acetone, but readily soluble in chloroform. 15 parts of pyridine sulphuric anhydride are added to 30 parts of acetic anhydride, warmed to 100° C. On solution of the pyridine sulphuric anhydride, 15 parts of cellulose in the form of filter paper are added. The mixture is stirred for about fifteen minutes, the temperature being maintained at about 100° C., and a homogeneous solution thus obtained. This is cooled, and added to water, whereby a white amorphous powder is precipitated, containing up to about 56% of acetyl group. The product is only very slightly soluble in acetone, but readily soluble in chloroform or pyridine.

Example II

According to this example, cellulose acetate soluble in acetone is produced. 15 parts of pyridine sulphuric anhydride, 20 parts of glacial acetic acid, and 10 parts of acetic anhydride are mixed, heated to 100° C., and 15 parts of paper cellulose added. The mixture kept at 100° C. is stirred for fifteen minutes, cooled, and poured into water as in Example I. The product is soluble in acetone, in which it yields viscous solutions.

Example III

According to this example 60 parts of glacial acetic acid are mixed with 25 parts of acetic anhydride and heated to 80° C. 1 part of pyridine sulphuro-anhydride is added and stirred until dissolved and then 16 parts of cellulose paper are stirred into the mixture and the melt maintained at 100° C. for 1 hour. At the end of this time a further 10 parts of acetic anhydride containing 0.5 part of pyridine sulphuro-anhydride are added and the heating at 100° C. continued for a further hour. The cellulose rapidly acetylates and passes into solution giving a clear colourless viscous solution.

Example IV

According to this example to a mixture of 50 parts glacial acetic acid and 35 parts of acetyl chloride is added 1 part of pyridine sulphuro-anhydride and heated to 60° C. until the latter has entirely dissolved. 16 parts of paper cellulose are then added and the temperature maintained at 60–70° C. for a period of 2 hours. Acetylation of the cellulose takes place and the paper dissolves giving a clear colourless solution.

Example V

According to this example to a mixture of 45 parts mono-chlorbenzene and 35 parts of acetic anhydride is added 1 part of pyridine sulphuro-anhydride and the temperature raised to 80° C. and kept at this until solution of the latter is complete. 16 parts of paper cellulose are then added, the temperature is raised to 100° C. and maintained at this for a period of two hours. Acetylation takes place and the cellulose dissolves forming a clear colourless solution of high viscosity.

Example VI

According to this example to a mixture of 60 parts glacial acetic acid and 35 parts of acetic anhydride is added 1 part of pyridine sulphuro-anhydride, and the temperature raised to 80° C. until the latter completely dissolves. 16 parts of paper are then added and the mixture maintained at 80° C. for ½ hour when a further 5 parts of acetic anhydride containing 0.5 part of pyridine-sulphuro-anhydride are put in and the melt maintained at 80° C. for one hour. Acetylation gradually takes place and the paper dissolves forming a clear colourless viscid solution of cellulose ester.

Example VII

According to this example 60 parts of glacial acetic acid are mixed with 50 parts of acetic anhydride and 1 part of pyridine sulphuro-anhydride and the whole raised to 80° C. and stirred until the pyridine sulphuro-anhydride is in solution. 15 parts of paper pulp are then added, the temperature raised to 95° C. and kept at this for one hour. A further 10 parts of acetic anhydride and 1 part of pyridine sulphuro-anhydride are then added at 95° C. and the temperature maintained at this for 2 hours longer. The product obtained is a clear slightly yellow viscid solution.

General

By the presence of pyridine sulphur trioxide, acetylation of cellulosic material may be readily carried into effect. When this substance is used to assist the acetylation, the conditions may be varied so as to produce a number of different products which are soluble in different solvents, and which contain different amounts of combined acetic acid. Some of the products, particularly the lower and middle members, are soluble in the ordinary solvents such as acetone and chloroform yielding viscous solutions which can be spun into threads or made into films or the like.

As regards the diluents, we find that acetic acid and its derivatives, such as chloracetic ester and also chlorbenzene, chlortoluene and other chlorinated aromatic hydrocarbons are suitable.

Other cellulose materials may be used, such as for example, cotton wool and paper pulp.

The process may be so carried out as to yield, amongst other products, a cellulose acetate which contains up to about 56% of acetyl group.

Having now described our invention, what we claim as new and desire to secure by Letters Patent is:—

A process for the acetylation of cellulosic matter effected by heating with acetic anhydride in the presence of pyridine sulphuric anhydride.

In testimony whereof we have signed our names to this specification.

BIRKETT WYLAM.
J. THOMAS.